Patented June 8, 1954

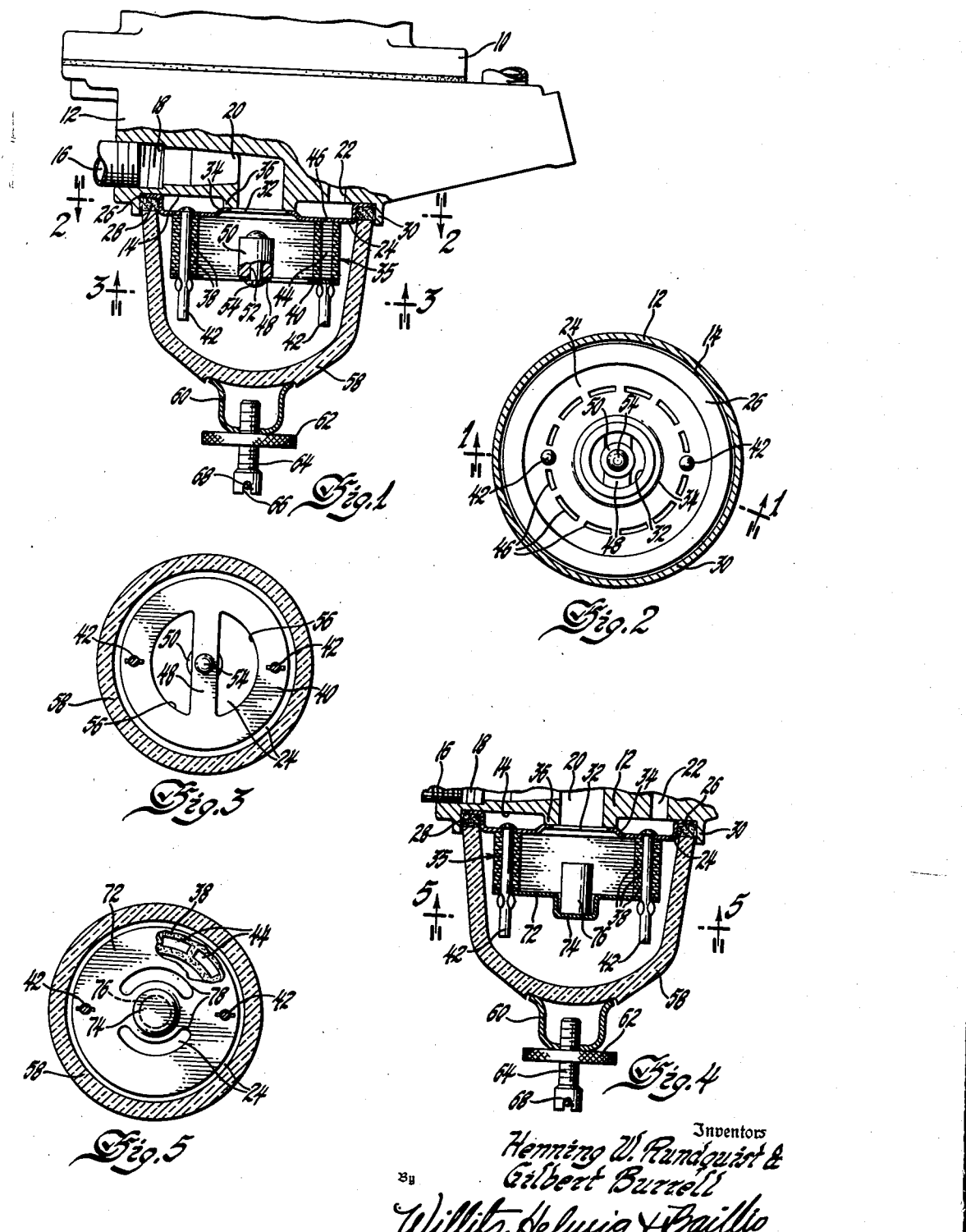

2,680,519

UNITED STATES PATENT OFFICE 2,680,519

FUEL STRAINER WITH MAGNET

Henning W. Rundquist, East Lansing, and Gilbert Burrell, Lansing, Mich., assignors to General Motors Corporation, Detroit, Mich., a corporation of Delaware Application August 9, 1950, Serial No. 178,524

5 Claims. (Cl. 210—1.5)

This invention relates to improved magnetic strainers and more particularly to improved magnetic fuel strainer for use in the fuel system of a power plant.

The invention is illustrated in conjunction with a fuel strainer mounted on the housing of an automotive fuel pump. However, it will be seen that the magnetic separator construction may be employed with many different types of strainers. In automotive use, the problem of cleaning the fuel, such as gasoline, has become increasingly important due to the highly developed carburetors now employed. These carburetors have finer nozzles and thus make the fuel filtering or straining problem more critical. Due to the fine nozzles, the strainer elements have been made increasingly fine. As the fineness of the strainer elements has been increased the required fuel pump pressure has increased and the strainer elements become clogged quicker. In many applications, the deposit on the surface of the strainer element consisted largely of small iron particles. It was found that this problem could be solved by placing a magnet in the inlet flow stream of the strainer. Thus substantially all the fluid entering the strainer passed sufficiently close to the magnet so that any iron particles would be attracted to the magnet before they reached the strainer element. The invention is illustrated in a strainer construction having a cylindrical strainer element located in a housing formed to provide an entrance passage opening into the center of the cylindrical filter element. At the other end of the cylindrical filter element there is an annular end plate to hold the filter element in position. The end plate has a diametrically extending bar to support the magnet centrally within the strainer element. When the fluid enters through the inlet passage, it passes over and around the magnet before contacting the strainer element. The magnetic material, such as iron particles, in the unfiltered fluid will be attracted to and held by the magnet. The magnetic particles will not be deposited on the surface of the strainer element and therefore the strainer will not be clogged and will have a longer life.

A primary object of the invention is to provide an improved fuel strainer with a magnet located in the fluid inlet path so that magnetic materials in the fluid will be removed to prevent their being deposited on the strainer element.

Another object of the invention is to provide in a fuel strainer assembly an improved support for a separator magnet in a fuel strainer which has openings to provide for flow past the magnet to the fuel strainer.

A further object of the invention is to provide in a fuel strainer a magnet secured within the strainer assembly by magnetic attraction to a portion of the strainer assembly.

A further object of the invention is to provide in a fuel strainer, a supporting plate having a recess to receive a magnet and hold it by magnetic attraction and having apertures adjacent the recess to guide the flow of fluid adjacent the magnet.

These and other objects of the invention will be apparent from the following specification and drawing.

Figure 1 shows a partial view of a fuel pump and strainer assembly with parts broken away and in partial section on the line 1—1 of Figure 2 to show details of the fuel strainer and magnet.

Figure 2 is a cross section of Figure 1 on the line 2—2 showing the top of the filter element.

Figure 3 is a cross section of Figure 1 on the line 3—3 showing the bottom of the filter element.

Figure 4 is a partial sectional view of a modified filter element with a magnet.

Figure 5 is a cross section of Figure 4 on the line 5—5 showing the bottom of the filter element.

The invention is illustrated in a fuel strainer attached to a fuel pump housing 10. The lower portion 12 of the fuel pump housing has an annular recess 14. The fuel inlet pipe 16 is threadably secured to an aperture 18 in the side of the fuel pump housing. The pipe connects with a fuel inlet passage 20 which extends downwardly in the center of the annular recess 14. At one side in the annular recess 14 an outlet passage 22 extends upwardly to the pumping chamber (not shown) within the housing 10.

The strainer assembly is mounted on an annular plate 24 which has a peripheral offset seat portion 26 to provide a seat for the gasket 28. The peripheral portion 26 of the plate fits in the outer portion of the annular recess 14 and is retained in position by the lip 30 surrounding the annular recess. The plate 24 has a central aperture 32 in alignment with the inlet passage 20. Surrounding the aperture 32, there is an offset portion 34 which provides a seal by engaging the inner lip 36 of the annular recess. The strainer element 35 consists of a plurality of annular strainer washers 38 and a backing washer 40 which have aligned apertures for the securing rivets 42 which secure them to the plate 24. The filter washers 38 have a series of apertures 44 extending completely around each of the annular washers. The apertures 44 of each washer 38 are aligned to provide a plurality of vertical passages extending through the stack of filter washers. The filter support washer 40 positioned at the bottom of the stack of filter washers is not apertured and therefore seals the lower ends of the vertical passages. The support plate 24 has apertures 46 aligned with each of the vertical passages formed by the apertures 44 in the filter washers 38 to provide outlet for the filtered fluid.

The filter support plate 40 has a transverse bar 48 extending diametrically across the plate. A small cylindrical magnet 50 is positioned at the center of the plate which is made of a nonmagnetic material. The magnet has a central aperture 52 so that a rivet 54 may be employed to secure the magnet 50 to the support bar 48. The semi-circular apertures 56 positioned on each side of the support bar 48 guide the flow of the unfiltered fluid so that it passes close to the magnet 50 and any magnetic impurities will be removed.

The strainer and magnet assembly is enclosed in a glass bowl 58 whose top edge engages the seal 26. An abutment 60 seats in a recess in the lower portion of the glass bowl and is engaged by the adjustable thumb wheel 62 and screw 64. The screw has a slotted head 66 to receive the bail 68 which is pivotally attached to the sides of the lower pump housing 12 in the conventional manner.

A modified mounting for a magnet mounted within a fuel strainer of this type is illustrated in Figures 4 and 5. The fuel strainer is again mounted on the lower portion 12 of the fuel pump housing. The fuel pump housing has an inlet 20 from the fuel supply and outlet 22 to the pump chamber. The same type of filter element 35 consisting of a plurality of filter washers 38 is mounted on a plate 24. In this modification the lower plate 72 is substantially solid and has a central recess 74 which provides a pocket for the cylindrical magnet 76. The plate 72 is made of a magnetic material, such as iron, so that the magnet 76 will hold itself in position by magnetic attraction. The upper plate 24 and the filter washers and the plate 72 have suitably aligned apertures to receive the rivets 42 which are employed to secure the assembly together. The plate 72 has an aperture 78 having the shape of an annular segment positioned on each side of the recess 74 and magnet 76 to direct the flow of the unfiltered fluid over the magnet. This strainer assembly may be similarly housed in a glass bowl 58 sealed to the pump body portion 12 by gasket 28. The bowl 58 is held in position by abutment 60 and the adjustable wheel 62 and screw 64 which engage the conventional bail 68.

When the pump 10 is in operation, the fluid from a suitable source of supply is drawn through the pipe 16 and enters through the passage 20 to the top center of the strainer bowl. The fluid passes over and around the magnet 50 so that all magnetic particles in the fuel are separated and attach themselves to the magnet. The apertures 56 in the lower plate 40 guide part of the fluid over the magnet 50. The filtered fluid is then cleared of magnetic particles which would clog the surface of the filter washers 38 and the fluid flows between or through the washers 38 to the passage 44 to the outlet passage 22. In a modified form of the invention, the fluid flows through the strainer and magnet element in the same manner. The lower plate 72 of the filter element is made of a ferrous material so that the magnet 76 holds itself in position in the recess 74. The plate 72 is also apertured closely adjacent the magnet 76 in order to guide the flow of fluid over the magnet to collect the magnetic metal particles before they deposit on the filter element. It will be noted that the openings in the plate 72 are quite small and their small size results in the plate 72 serving more effectively as a baffle to prevent any particles which may collect in the bottom of the bowl from being stirred up and drawn to the filter element where they would tend to clog the filter element and reduce its life.

The preferred embodiments of the invention have been illustrated in the above specification and drawing. It will be apparent that many modifications may be made within the scope of the invention as defined by the appended claims.

We claim:

1. In a combination strainer and magnetic separator, a housing, an inlet opening at the top center of said housing, an outlet opening in said housing, an annular strainer element secured to said housing and sealed to said housing around the inlet opening, said annular strainer element having central drainage passages spaced around said annular filter for the filtered fluid, means connecting said central drainage passages to said outlet opening, a magnetic material support member secured to the base of said filter element, a rod-like magnet secured to said magnetic material member entirely by magnetic attraction in the path of the incoming unfiltered fluid, and mechanical means to prevent lateral movement of said magnet.

2. In a combination strainer and magnetic separator, a housing, an inlet opening at the top center of said housing, an outlet opening in said housing, an annular strainer element secured to said housing and sealed to said housing around the inlet opening, said annular strainer element having central drainage passages for the filtered fluid, means connecting said central drainage passages spaced around said annular filter to said outlet opening, a magnetic material support member having a central recess secured to the base of said filter element, and a rod-like magnet positioned in said recess to limit lateral movement and secured entirely by magnetic attraction to said bar in the path of the incoming unfiltered fluid.

3. In a strainer, a housing having an inlet and an outlet opening, a strainer element having one surface contacting unfiltered fluid and another surface contacting filtered fluid positioned between said inlet and outlet openings and supported on said housing, said strainer element dividing said housing into an inlet chamber facing said one surface and an outlet chamber facing said another surface, means to connect said inlet opening directly to the unfiltered fluid chamber of said housing and to connect the outlet opening to filtered fluid portion of said housing, an elongated rod-like magnet supported on said housing entirely by magnetic attraction, said magnet being positioned within said housing directly opposite said inlet opening and extending coaxially toward said inlet opening and terminating a short distance from said inlet opening and having a free end portion facing said inlet opening in the path of the unfiltered fluid.

4. In a strainer, a housing having an inlet and an outlet opening, a generally cylindrical strainer element located coaxially of said inlet and having one surface contacting unfiltered fluid and another surface contacting filtered fluid positioned between said inlet and outlet openings and having one end supported on said housing, said strainer element dividing said housing into an inlet chamber facing said one surface and an outlet chamber facing said another surface, means to connect said inlet opening directly to the unfiltered fluid chamber of said housing and to connect the outlet opening to filtered fluid portion of said housing, an elongated rod-like magnet supported on the other end of said strainer entirely by magnetic attraction, said magnet being positioned within said housing directly opposite said inlet opening and extending coaxially toward said inlet opening and terminating a short distance from said inlet opening and having a free end portion of smaller diameter than said inlet opening facing said inlet opening and a side portion in the path of the unfiltered fluid.

5. In a strainer, a housing having an end wall, said end wall having an inlet located centrally of said end wall and entering said housing along the axis of the housing, said end wall having an outlet opening adjacent said inlet opening, an annular strainer element positioned coaxially within said housing and located coaxially with respect to said inlet opening, said strainer element having an outer and inner cylindrical surface contacted by the unfiltered fluid and a plurality of passages extending vertically through said annular strainer element contacted by the filtered fluid, said passages being connected to said outlet opening at one end of said strainer and closed at the other end of said strainer, said one end of said strainer element being supported adjacent and on said end wall of the housing, a backing washer secured to said other end of the said strainer element and having a support portion centrally located within said strainer element on the axis of the strainer and the inlet opening, a rod-like magnet secured to said support portion and extending from said other end of said strainer element toward said one end of said strainer element and terminating in spaced relation from said inlet opening to permit free flow of all the unfiltered fluid entering said strainer around said magnet before it reaches the strainer.

References Cited in the file of this patent

UNITED STATES PATENTS

| Number | Name | Date |
|---|---|---|
| 2,117,361 | Rohrbach | May 17, 1938 |
| 2,149,764 | Frei | Mar. 7, 1939 |
| 2,159,196 | Babitch | May 23, 1939 |
| 2,399,994 | Feagin | May 7, 1946 |
| 2,508,666 | Frantz | May 23, 1950 |